United States Patent [19]

Herbst

[11] Patent Number: 5,382,158

[45] Date of Patent: Jan. 17, 1995

[54] INJECTION MOLDING APPARATUS COMPRISING A STACK MOLD

[76] Inventor: Richard Herbst, Freisinger Strasse 3 b, D-8057 Eching, Germany

[21] Appl. No.: 75,212

[22] Filed: Jun. 10, 1993

[30] Foreign Application Priority Data

Jun. 17, 1992 [DE] Germany .................... 4219924

[51] Int. Cl.$^6$ .............................................. B29C 45/64
[52] U.S. Cl. ..................................... 425/572; 425/589
[58] Field of Search ..................... 425/572, 574, 589

[56] References Cited

U.S. PATENT DOCUMENTS 5,069,615 12/1991 Schad et al. .................. 425/572
5,112,558 5/1992 Schad et al. .................. 425/572

Primary Examiner—Tim Heitbrink

[57] ABSTRACT

An injection molding machine has a stack mold (10). Stack mold (10) has two outer mold portions (3, 7) enclosing a center platen (13) between them. Center platen (13) and mold portions (3, 7) define form hollow cavities and are provided with a connector opening (27) and feed ducts (15) for the form hollow cavities. The injection molding machine, further, has a drive-and-close unit (11) for effecting a relative movement between the mold portions (3, 7) and the center platen (13) for opening and closing the form hollow cavities, respectively. Moreover, the injection molding machine has an injection molding device (29) that may be coupled to connector opening (27) and remains coupled to the connector opening (27) during the relative movement between the mold portions (3, 7) and the center platen (13). The injection molding device (29) is directly connected to the center platen (13).

20 Claims, 3 Drawing Sheets

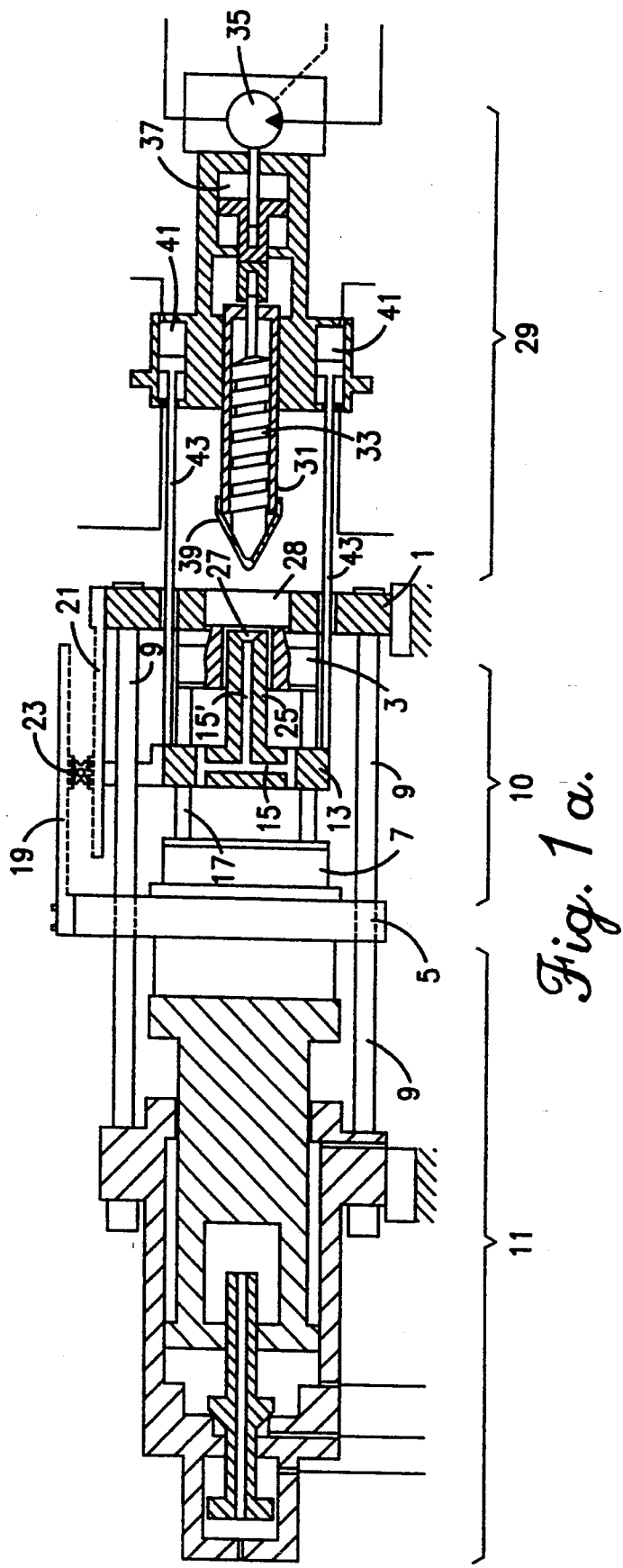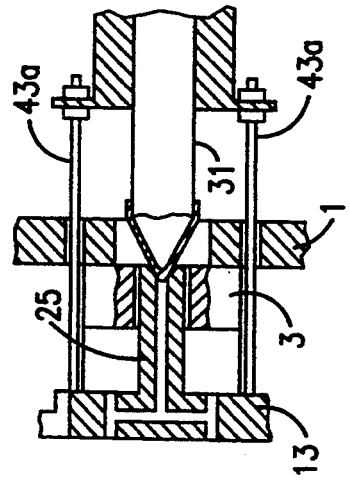
Fig. 1a.
Fig. 1b.

INJECTION MOLDING APPARATUS COMPRISING A STACK MOLD

BACKGROUND OF THE INVENTION

1. Field of the Invention

The invention relates to an injection molding apparatus comprising a stack mold with two outer mold portions enclosing a center platen between them, the center platen on two sides thereof, together with the mold portions, defining hollow form cavities and having a connector opening and feed ducts therein, a drive-and-close unit being provided for effecting a relative displacement between the mold portions and the center platen for opening and closing, respectively, the hollow form cavities, and an injection molding device being adapted for connection to the connector opening, the injection molding device remaining connected to the connector opening during the relative displacement between the mold portions and the center platen.

2. Description of the Related Art

An injection molding apparatus of the afore-mentioned kind has been known from JP-U2 62-18418.

The prior art injection molding machine is provided with a stack mold having a center platen and one outer mold portion being displaceable whereas the other mold portion is stationary. By means of a first piston-cylinder-unit the displaceable mold portion may be displaced. The displaceable mold portion is provided with a spur rack, meshing with a pinion being rotatably journalled on the center platen. The stationary mold portion, too, is provided with a spur rack which, too, meshes with the pinion being journalled on the center platen. By means of this gear one can, therefore, continuously close the entire stack mold during displacement of the displaceable mold portion because due to the action of the gear the center platen will be displaced with half the velocity, as compared with the displaceable mold portion.

In the prior art injection molding machine the injection molding device is arranged besides the stationary mold portion on that side being opposite to the center platen. The injection molding device is arranged on a carriage and can, therefore, be displaced in the same direction as the displaceable mold portion and the center platen. The carriage is provided with a second piston-cylinder-unit. The cylinder of the latter is rigidly connected with the carriage of the injection molding device whereas the piston rod is rigidly connected with the stationary mold portion. A piston on the piston rod is designed double-acting with the effective surface areas on both sides of the piston being differently sized. In this way the injection molding device can be displaced relative to the stationary mold portion.

The injection molding device is connected to the center platen by means of an elongate injection cylinder which extends through a through opening in the stationary mold portion. An injection cylinder mouthpiece is pressed against an input opening of the center platen. The pressure exerted on the mouthpiece may be predetermined by means of the second piston-cylinder-unit.

When the stack mold is opened by actuating the first piston-cylinder-unit, one may appropriately control the second piston-cylinder-unit such that the injection molding device follows the center platen during the displacement of the latter so that the injection cylinder mouthpiece will remain in contact on the input connector opening of the center platen.

In this way the injection molding device together with the center platen are a unit that is not separated during the opening and the closing displacement of the stack mold. The required reaction forces between the center platen and the injection molding device are supported by a building base, on the one hand from the center platen via the pinion, the spur rack, the displaceable mold portion and the first piston-cylinder-unit and, on the other hand, via the injection molding device, its carriage, cylinder, piston, piston rod and the stationary mold portion.

The prior art injection molding machine has the disadvantage that substantial pressures that have to be effected between the injection molding device mouthpiece and the center platen have to be supported by the base of the injection molding machine over this very complicated path of travel. Another disadvantage of the prior art machine tool is that the injection molding device must constantly follow the center platen due to the aforedescribed hinematics of the machine by supporting the second piston-cylinder-unit on the stationary mold portion via a continuous control and actuation of the second piston-cylinder-unit. Therefore, it is mandatory to constantly control the pressure within the second piston-cylinder-unit, i.e. during each displacement for opening and for closing, respectively, of the stack mold. This requires a relatively complicated control and may be the cause for failures, in particular due to leaks in the piston-cylinder-units that are constantly in action.

SUMMARY OF THE INVENTION

It is, therefore, an object of this invention to improve an injection molding apparatus of the kind mentioned at the outset such that the injection molding device may constantly remain in contact with the center platen with a much simpler design of the injection molding machine, with much more favorable application of reaction forces and, finally, without the necessity of constantly controlling and actuating piston-cylinder-units.

According to the invention this object is achieved by directly connecting the injection molding device to the center platen. The object underlying the invention is thus entirely solved. For, the direct mechanical interconnection between the injection molding device and the center platen has the effect that during the operation of the injection molding apparatus, i.e. during the periodical opening and closing, respectively, of the stack mold no actuating means that would have to be provided between the center platen and the injection molding device have to be actuated and controlled. In contrast, it is entirely sufficient to interconnect the injection molding device with the center platen one time only during the setup of the injection molding machine whereas during the entire time of operation of the injection molding machine these two elements may remain in contact with each other until a new mold has to be inserted or for performing standard service on the machine after the production of a relatively large number of plastic material parts.

According to a preferred embodiment of the invention the injection molding device is connected to the center platen by means of rod means.

This measure has the advantage that the rigid mechanical interconnection between the injection molding device and the center platen may be established quite simply in that the two elements are interconnected with the rods so that the required pressure or contact force between the two elements may be set by appropriately mechanically biasing rods.

According to an improvement of this embodiment, the rod means are designed as piston rods of positioning cylinders.

This measure has the advantage that a remote control and, therefore, an automation during the interconnection between the center platen and the injection molding device may be made. According to another embodiment, however, the rod means are designed as bolts.

This measure has the advantage that an essentially less costy and simpler type of connector (bolts) are used resulting in substantial cost savings. Considering that the interconnection between the center platen and the injection molding device must only be separated during a mold change or during standard service operations, i.e. in relatively large intervals of time only, it is entirely sufficient for the function of the injection molding machine to interconnect the center platen and the injection molding device via bolts.

According to further preferred embodiments of the injection molding apparatus according to the invention, according to one alternative, one of the mold portions may be made stationary, as explained above in relation to the closest prior art, however, according to another alternative, being a kinematic inversion, the center platen may be made stationary and both mold portions may be made displaceable in relation to the latter.

According to still another embodiment of the machine according to the invention, the center platen is provided with a snorkel, extending through a through opening of the mold portion when the stack mold is closed and has on its end a connector opening for a discharge of an injection cylinder of the injection molding device.

Of course, one can, again by kinematic inversion, provide the snorkel on the discharge terminal of an injection cylinder of the injection molding device, extending through a through opening in one mold portion when the stack mold is closed and being provided on its end with a discharge opening for coupling to a connector opening of the center platen.

BRIEF DESCRIPTION OF THE DRAWINGS

Embodiments of the invention will now be described in connection with drawings. There is shown:

FIGS. 1a and b schematic section views through an injection molding;

FIGS. 4a and 4b detailed representations of modifications of the arrangement of FIG. 1a;

DETAILED DESCRIPTION OF THE INVENTION

Figure 2:
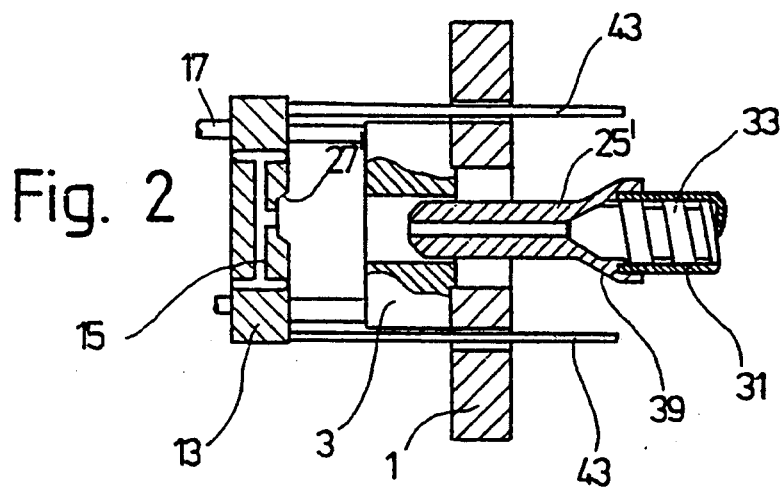
FIG. 2 a detail of the machine of FIG. 1, however, in an alternate modification.

The injection molding machine shown in FIG. 1a has a stack mold 10 with a stationary mold mounting plate 1 carrying an injection mold portion 3, and with a displaceable mold mounting plate 5 carrying a displaceable injection mold portion 7. The displaceable mold mounting plate 5 is guided by means of guides 9 relative to stationary mounting plate 1 and can be driven by means of a drive-and-close unit 11 for an opening and a closing movement, respectively, and may be subjected to the required closing pressure.

The stack mold 10 is provided with a so-called center platen 13 between mold portions 3 and 7. Mold portions 3 and 7 and the center platen 13 are each provided with form recesses (not shown), facing each other and defining hollow form cavities. Center platen 13, further, is provided with feed ducts 15 for feeding and distributing molten plastic material into the hollow form cavities, defined by mold portions 3, 7 and center platen 13.

Center platen 13 is displaceable along guides 17 relative to mold portions 3, 7 and is coupled with displaceable mold mounting plate 5, as known per se, by means of a drive gear incorporating a 2:1 transmission so that during the opening and the closing displacement, respectively, of displaceable mold mounting plate 5, center platen 13 will be moved with half the speed and over half of the opening travel path. As an example for such drive transmission, FIG. 1 shows two spur racks 19, 21 extending parallel to each other and being connected to stationary mounting plate 1 and displaceable mounting plate 5, respectively, and meshing with a pinion 23 being journalled on center platen 13. The drive transmission with a 2:1 transmission ratio can, however, also be designed otherwise, for example by means of a worm gear or a chain transmission, as is known to an artisan.

Center platen 13 is provided with a protruding pipe-shaped connector nozzle at its side facing stationary mold mounting plate 1, the nozzle being usually identified as a snorkel 25 and having a central feed duct 15', extending to a connector opening 27 at a terminal of snorkel 25. Mold mounting plate 1 as well as injection mold portion 3, carried by the latter, each are provided with a center opening 28 for receiving snorkel 25 until a position when in the closed state of stack mold 10 center opening 27 will protrude over the back surface of stationary mold mounting plate 1.

An injection molding device 29 is located on the right hand side of mold mounting plate 1 in FIG. 1a. Injection molding device 29 is provided with an injection cylinder 31, as known per se, and has a rotatable and axially displaceable screw conveyor 33 therein. By means of a hydraulic or electric rotation drive 35 screw conveyor 33 is rotated, for plastifying and homogenizing the plastic material, whereas a hydraulic cylinder 37 is provided for the axial displacement of screw conveyor 33 in order to perform the injection molding action. Injection cylinder 31 has a conical mouthpiece 39 with a nozzle at its terminal end, the nozzle being adapted to fit into connector opening 27 of snorkel 25.

By means of hydraulic positioning cylinders (i.e., piston-cylinder combinations) 41 entire injection molding device 29 may be axially displaced for pressing mouthpiece 39 of injection cylinder 31 against connector opening 27 of snorkel 25, so that a tight coupling of injection cylinder 31 to central feed channel 15' of center platen 13 is established. Piston rods 43 of hydraulic positioning cylinders 41 are guided through openings in stationary mold mounting plate 1 and are rigidly connected to center platen 13.

As shown in FIG. 1b, instead of using hydraulic positioning cylinders 41 the mechanical connection between the center platen and the injection molding device may also be made by using bolts 43a which, too, act as rods like piston rods 43 of positioning cylinder 41.

When injection cylinder 31 is pressed against snorkel 25 of center platen 13 by the action of pressure fluid in the left chamber of positioning cylinder 41 of FIG. 1a, center platen 13 and entire injection molding device 29 act as a rigidly coupled unit so that injection molding device 29 follows the opening and the closing displacement, respectively, of center platen 13. By so coupling injection molding device 29 to center platen 13 the coupling of mouthpiece 39 to connector opening 27 is guaranteed during the entire injection molding process, i.e. over many injection cycles including the opening and the closing displacement, respectively, of the hollow form cavities.

The piston-cylinder combinations 41 include piston rods 43. The pressing force of positioning cylinders 41 acts via piston rods 43 directly between injection molding device 29 and center platen 13 so that the closing forces between the two outer mold portions 1, 3 or 5, 7, respectively, and center platen 13 cannot be unequally distributed.

FIG. 2 shows a detail of a slightly modified embodiment. In this embodiment the connector nozzle or snorkel 25' extending through center opening 28 of stationary mounting plate 1 and mold portion 3 is not associated to center platen 13 but, instead, is designed as an extension of mouthpiece 39. Center platen 13 in this embodiment is not provided with a snorkel but, instead, has only a respectively shaped connector opening 27' for being coupled to the front end of snorkel 25' by applying pressure.

In this way, the length of feed duct 15 in center platen 13 is essentially reduced and, therefore, the amount of material remaining in the feed ducts 15 of center platen 13 during a change of color or a change of material, is essentially smaller. Therefore, the cleaning of feed ducts 15 in center platen 13 is simplified. The amount of material remaining in the center bore of snorkel 25 can, after decoupling injection cylinder 31 from center platen 13, simply be ejected into the free space. The loss of material is thus reduced and the risk of affecting the next-to-follow injection process by material remnants during a change of color or material, is drastically reduced.

Figure 3:
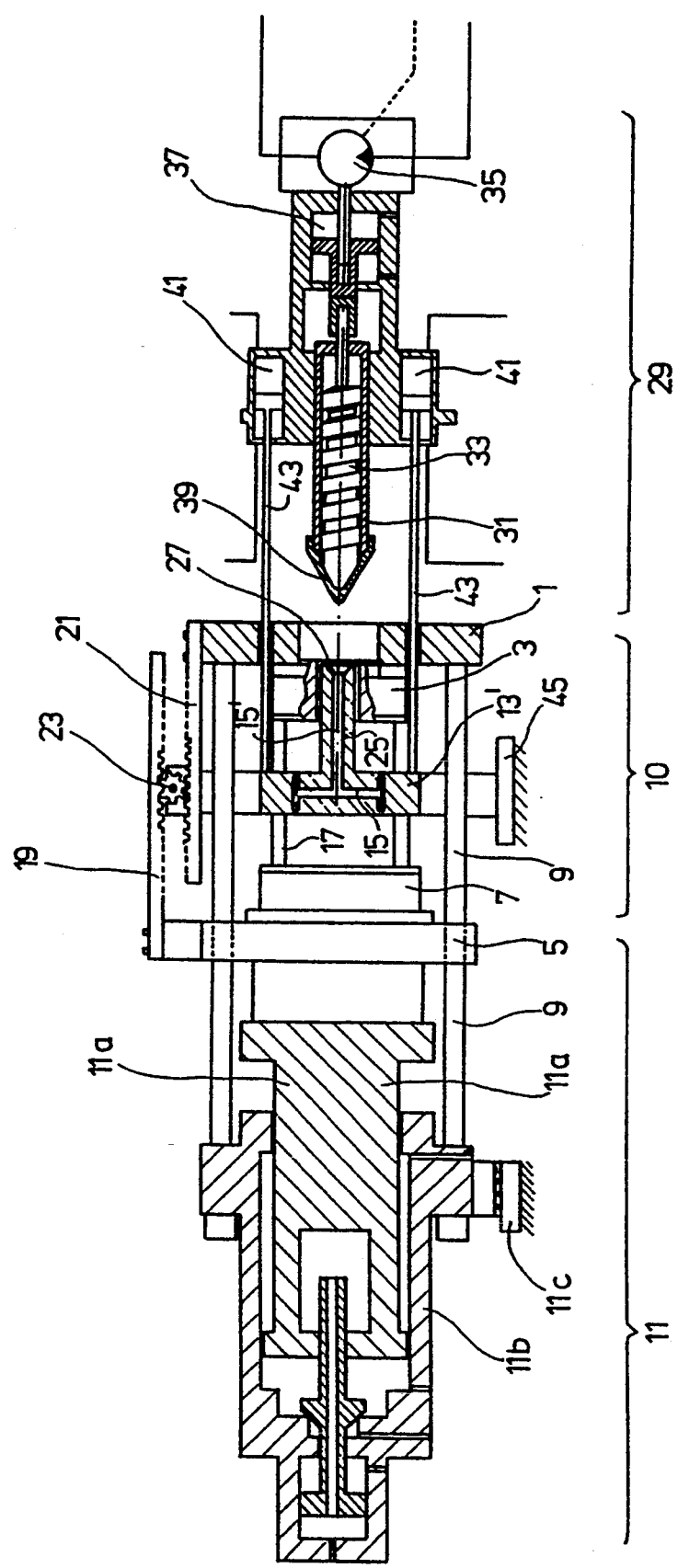
FIG. 3 a representation, similar to that of FIG. 1, however, of an injection molding machine according to a second embodiment of the invention.

The embodiment of an injection molding machine shown in FIG. 3 differs from the embodiment of FIG. 1a in that the center platen, now designated as 13', is not displacable but, instead, is made stationary, as indicated schematically in FIG. 3 by means of a building base 45. In contrast, the two mold mounting plates 1, 5, arranged on both sides of center platen 13' and having mold portions 3 and 7 attached thereto, are made displaceable and are strictly coupled for reciprocal movement by means of spur racks 19, 21 meshing with pinion 23 journalled on center platen 13'.

If a piston 11a of drive-and-close unit 11 exerts a right-hand oriented force on mounting plate 5 in FIG. 3 for pressing mold portion 7 against center platen 13', then an equal, left-hand oriented force in FIG. 3 will be exerted on mold mounting plate 1 with mold portion 3. The displacements of mold mounting plates 1, 5 are synchronized via toothed transmission 19, 21, 23 for an exactly reciprocal movement relative to stationary center platen 13. It goes without saying that other drive mechanisms may also be used for driving mold mounting plates 1, 5 in reciprocal opening and closing movements, respectively, relative to stationary center platen 13'.

In the embodiment of FIG. 1a the injection molding device 29 is arranged displaceable and can, e.g. be displaced via positioning cylinders 41 for coupling mouthpiece 39 of injection cylinder 31 to connector opening 27 of snorkel 25 associated to center platen 13' in order to achieve a tight coupling. This embodiment, too, may be modified according to FIG. 2 such that snorkel 25 is not provided on center platen 13' but, instead, is provided on mouthpiece 39 of injection cylinder 31.

In the embodiment of FIG. 3 the piston rods 43 of positioning cylinder 41 are also rigidly connected to center platen 13'. When the operating chambers of positioning cylinder 41 arranged on the piston rod side thereof are subjected to pressure fluid, then entire injection moulding device 29 will be pressed against snorkel 25 of center platen 13' so that injection molding device 13 and center platen 13' act as a rigid and stationary unit. Snorkel 25 is dimensioned as long, that when injection cylinder 31 is coupled, there is still enough space available for performing the opening and the closing movement, respectively, of mold mounting plate 1 with mold portion 3.

Therefore, also in this embodiment injection cylinder 31 may remain constantly coupled to center platen 13' during subsequent injection cycles and need not be decoupled and recoupled again for each injection cycle. Instead of rigidly coupling piston rods 43 of positioning cylinder 41 to stationary center platen 13' they can also be rigidly coupled to another stationary stop and, in that case, need not extend through mold mounting plate 1.

Figure 4A:
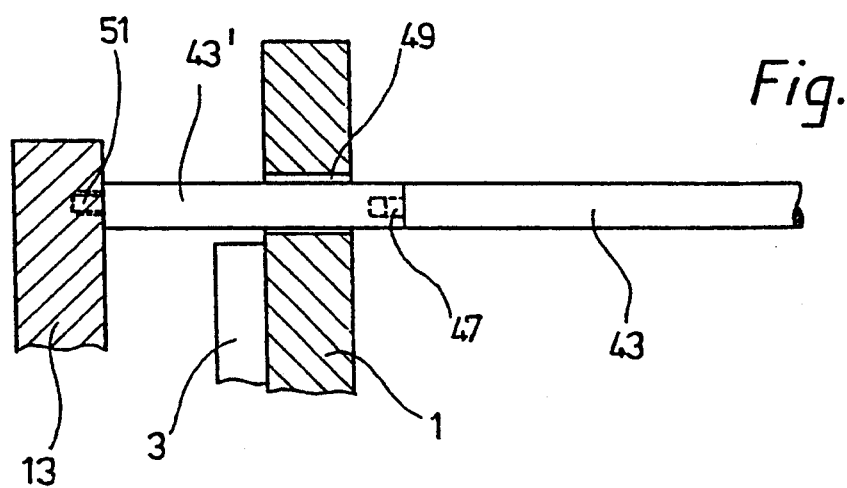

FIGS. 4(a) and (b) show design modifications of the embodiment of FIG. 1a, enabling to use the injection moulding machine of FIG. 1 a, if need be, also conventionally, i.e. with coupling and decoupling of injection cylinder 31 during each injection cycle.

For that purpose FIG. 4(a) shows that each of the piston rods 43 acting as pulling rods and interconnecting center platen 13 with positioning cylinders 41 of injection molding device 29 in FIG. 1, are subdivided, i.e. are provided with an extension rod 43' being separably connected to piston rod 43, e.g. by means of a threaded pin 47. Extension rod 43' extends through a through opening 49 in stationary mold mounting plate 1 to center platen 13 and is rigidly, yet separably, connected to the latter, e.g. also by means of a threaded pin 51. With this embodiment of FIG. 4(a) the injection molding machine of FIG. 1a can be operated as described above with respect to FIG. 1a.

Figure 4B:
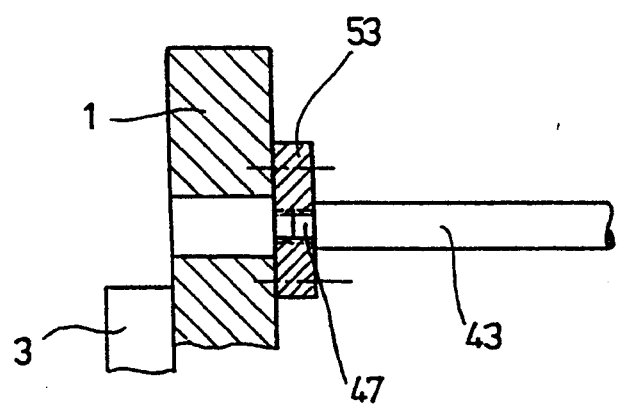

As shown in FIG. 4(b), extension rod 43' may be omitted and, instead, a flange 53 may be provided having an inner threaded bore into which threaded pin 47 of piston rod 43 may be turned. Flange 53 may be attached to stationary mold mounting plate 1 by means of bolts so that positioning cylinders 41 of the injection molding machine of FIG. 1a are connected with stationary mold mounting plate 1 as a stationary stop.

In a modification of FIG. 4a the arrangement may be made such that extension rods 43' are not flush with piston rods 43 but, instead, are displaced with respect to the latter. For that purpose, instead of flange 53 (FIG. 4(b)) a tranversal element is used that is connected with both piston rods 43 (FIG. 1a), e.g. by means of the threaded pins 47. Extension rods 43' may then be connected to this transversal element on the side opposite piston rods 43 and offset with respect to the latter, thus making the connection to center platen 13.

In still another modification (not shown) in the arrangement may be made such that both mold mounting plates 1, 5 and center platen 13 of the machine are made displaceable and, by means of appropriate affixing means either center platen 13 or nozzle side oriented mold mounting plate 1 may be made stationary. Positioning cylinders 41 of injection molding device 29 may also be coupled either to the nozzle side oriented mold mounting plate 1 or to center platen 13, e.g. as described with respect to FIG. 4. By means of such arrangement a conventional injection molding machine having an injection cylinder being coupled and decoupled to the displaceable center platen during each molding cycle by means of positioning means acting on the stationary mold mounting plate may either be converted into a machine according to FIG. 1a or a machine according to FIG. 2, i.e. with a center platen together with a permanently attached injection molding device being either commonly displacable or being a common stationary unit.

I claim:

1. An injection molding apparatus comprising:
 a stack mold having
  a first outer mold portion;
  a second outer mold portion;
  a center platen arranged between said first and said second outer mold portions along a longitudinal axis of said molding apparatus, said center platen having two lateral sides respectively opposed to said first and said second outer mold portions for defining hollow form cavities on said lateral sides between said center platen and each of said first and said second outer mold portions, said center platen being, further, provided with a connector opening opposed to said first outer mold portion; and
  a plurality of feed ducts in said center platen interconnecting said hollow form cavities with said connector opening;
 an injection molding device having an injection cylinder with a discharge means constructed and arranged to pass through said first outer mold portion and mate with said connector opening;
 a drive-and-close unit connected to said center platen and to said first and said second outer mold portions, respectively, for effecting a relative axial displacement therebetween to thereby open and close, respectively, said hollow form cavities; and
 means for establishing a continuous tight coupling between said center platen and said injection cylinder by pressing said discharge means against said connector opening, even during said relative axial displacement between said center platen and said first and said second outer mold portions.

2. The apparatus of claim 1, wherein said means for establishing a coupling includes a plurality of positioning piston-cylinder combinations connected at a first end to said center platen and at a second end to said injection molding device.

3. The apparatus of claim 1, wherein said means for establishing a coupling includes a plurality of bolts interconnecting said center platen and said injection molding device.

4. The apparatus of claim 1, wherein one of said outer mold portions is held stationary.

5. The apparatus of claim 4, wherein said first outer mold portion is held stationary.

6. The apparatus of claim 1, wherein said center platen is held stationary.

7. The apparatus of claim 1, further comprising a snorkel extending along said axis and through an axial opening in said first outer mold portion when said stack mold is closed, said snorkel being fixed in operative communication with said connector opening and abutting against, in operative communication, said injection molding device.

8. The apparatus of claim 7, wherein said means for establishing a coupling includes a plurality of positioning piston-cylinder combinations connected at a first end to said center platen and at a second end to said injection molding device.

9. The apparatus of claim 8, wherein said cylinders extend through said first outer mold portion.

10. The apparatus of claim 7, wherein said means for establishing a coupling includes a plurality of bolts interconnecting said center platen and said injection molding device.

11. The apparatus of claim 7, wherein one of said outer mold portions is held stationary.

12. The apparatus of claim 11, wherein said first outer mold portion is held stationary.

13. The apparatus of claim 7, wherein said center platen is held stationary.

14. The apparatus of claim 1, further comprising a snorkel extending along said axis and through an axial opening in said first outer mold portion when said stack mold is closed, said snorkel being fixed in operative communication with said injection molding device and abutting against, in operative communication, said connector opening.

15. The apparatus of claim 14, wherein said means for establishing a coupling includes a plurality of positioning piston-cylinder combinations connected at a first end to said center platen and at a second end to said injection molding device.

16. The apparatus of claim 15, wherein said cylinders extend through said first outer mold portion.

17. The apparatus of claim 14, wherein said means for establishing a coupling includes a plurality of bolts interconnecting said center platen and said injection molding device.

18. The apparatus of claim 14, wherein one of said outer mold portions is held stationary.

19. The apparatus of claim 18, wherein said first outer mold portion is held stationary.

20. The apparatus of claim 13, wherein said center platen is held stationary.

* * * * *